United States Patent

Susaki et al.

Patent Number: 5,386,622
Date of Patent: Feb. 7, 1995

[54] DEVICE FOR CHUCKING A ZIGZAG SPRING

[75] Inventors: Eiji Susaki; Matsuo Majima; Yaushi Kaku; Hiroshi Takagi, all of Akishima, Japan

[73] Assignee: Tachi-s Co., Ltd., Akishima, Japan

[21] Appl. No.: 139,226

[22] Filed: Oct. 19, 1993

[51] Int. Cl.⁶ ............................................. B23Q 15/14
[52] U.S. Cl. ................................. 29/717; 29/714; 29/225; 29/227
[58] Field of Search ................. 29/705, 709, 714, 717, 29/771, 789, 791, 797, 225, 227

[56] References Cited

U.S. PATENT DOCUMENTS

| | | | |
|---|---|---|---|
| 3,747,895 | 7/1973 | Martin | 29/227 |
| 4,070,743 | 1/1978 | Miyakawa et al. | 29/227 |
| 4,514,888 | 5/1985 | Wheeler | 29/227 |
| 4,653,185 | 3/1987 | Kajima et al. | 29/809 |
| 5,050,281 | 9/1991 | Yamashina | 29/227 |

FOREIGN PATENT DOCUMENTS

| | | | |
|---|---|---|---|
| 156629 | 6/1988 | Japan | 29/225 |
| 256432 | 10/1990 | Japan | 29/225 |
| 1421519 | 9/1988 | U.S.S.R. | 29/227 |

OTHER PUBLICATIONS

Abstract and Diagrams for Japanese Publication 60-48226 (A), Mar. 1985.

*Primary Examiner*—Mark Rosenbaum
*Assistant Examiner*—David P. Bryant
*Attorney, Agent, or Firm*—Oldham, Oldham & Wilson Co.

[57] ABSTRACT

A device for chucking a zigzag spring, which comprises a pair of pawl elements, a drive source, and a detector. One of the two pawl elements may be moved and stoped at at least one position by operation of the drive source through detection of the detector, and then both two pawl elements are brought into engagement with both end portions of the zigzag spring, respectively, according to a length of the spring. The detector may comprise a plurality of proximity switches, one of which detects movement of such one of the pawl elements to that particular position. By those plural proximity switches, a base position may be set for that one of pawl elements in relation to another of them, according to a selected one of plural different zigzag springs with different lengths.

6 Claims, 3 Drawing Sheets

5,386,622

DEVICE FOR CHUCKING A ZIGZAG SPRING

BACKGROUND OF THE INVENTION

1. Field of the Invention

The present invention relates to an automated system for mounting a zigzag (sinuous) spring onto a seat frame, and particularly to a device for chucking the zigzag spring in association therewith.

2. Description of Prior Art

As typically found in an automotive seat, a plurality of zigzag springs are provided on a seat frame within the seat in order to resiliently support an occupant sitting thereon, giving him or her a comfortable seating touch.

Recently, in assemblage of this sort of seat, the zigzag springs are automatically mounted securely on the seat frame by use of a particular spring mounting robot. The spring mounting robot has a movable arm controlled for a programmed automatic actions for transferring and mounting a zigzag spring to a seat frame. That movable arm is provided, at its forward free end, with a chucking device for chucking one of plural zigzag springs supplied from a spring supplier and retaining it for mounting to a seat frame placed on a mounting section.

Conventionally, the chucking device includes a pair of movable pawl portions, each being engageable with the respective both ends of a zigzag spring and movable away from each other in a direction to expand the spring. Such chucking action is caused by an air cylinder, for instance, and thereafter, the chucking device with the zigzag spring is transferred by the arm, under a programmed control, towards a seat frame placed on a mounting section, mounting the spring onto the seat frame such as to engage both ends of the spring over a pair of opposed hangers provided on the side frame portions of seat frame, respectively.

But, the thus-arranged conventional spring chucking device has only one predetermined limited movable range of the two pawl portions for chucking the zigzag spring, and is not designed to vary such pawl portion movable range in order to selectively chuck one of plural different springs with different lengths. As a result, it has been a problem that the spring chucking device is confined to only one kind of zigzag spring, and incapable of chucking other kinds of zigzag springs having different lengths.

SUMMARY OF THE INVENTION

With the above-stated drawbacks in view, it is therefore a purpose of the present invention to provide an improved device for chucking a zigzag spring, which is capable of chucking a zigzag spring, irrespective of its different length.

In order to achieve such purpose, in accordance with the present invention, there is basically provided a device for chucking a zigzag spring, for use in a system for automatically mounting the zigzag spring onto a frame, which comprises a first pawl element adapted to be engageable with one end portion of the zigzag spring and a second pawl element adapted to be engageable with the other end portion of the zigzag spring. The first pawl element is normally stopped at a reference fixed position corresponding to the one end portion of the zigzag spring and the second pawl element is moveable from the reference fixed position to a selected one of plural positions which corresponds to the other end portion of the zigzag spring. The device further comprises a plurality of detecting means, each defining the plural positions associated with the second pawl element, respectively; a first drive means for causing movement of the first pawl clement from the reference fixed position; and a second drive means which is operable with the plurality of detecting means to cause movement of the second pawl element toward the selected one of tile plural positions with respect to the reference fixed position. When the second drive means is operated in cooperation with the detecting means, the second pawl element is moved to the selected one of the plural positions with respect to the fixed reference position, so that both first and second pawl elements are positioned for engagement with tile respective ends of the zigzag spring in accordance with a particular length of the zigzag spring. Then, the first and second drive means are operated to move the first and second pawl elements away from each other so as to expand tile zigzag spring lengthwise more than the particular length, by chucking the zigzag spring in a length which allows the same to be properly mounted onto the frame.

Accordingly, one of the first and second pawl elements may simply be set at the abovementioned position to thereby provide a proper chucking condition for each of different zigzag springs according to the different lengths thereof.

Preferably, another of the first and second pawl elements may be normally stopped at a reference fixed position, so that the foregoing one of the same two pawl elements may be moved to that particular position in relation to such reference fixed position. With this arrangement, the chucking device per se may be adjustably displaced with regard to each of different spring suppliers which supplies different lengths of zigzag springs, giving a proper reference fixed position suited for each different zigzag spring and also permitting change of the abovementioned particular position according to the length of zigzag spring.

In one mode of the invention, the detecting means comprises a plurality of proximity switches, and the foregoing particular position is a selected one of plural positions which are each defined by the respective plural proximity switches, so that the foregoing one of first and second pawl elements may be moved to the selected one position through a corresponding one of those proximity switches.

Preferably, in addition to such one mode of invention, it may be arranged such that another of the two pawl elements is normally stopped at the reference position, and a pair of adjoining proximity switches is selected from the plural proximity switches, in such a manner that one of them defines a base position towards which the foregoing one of the two pawl elements should be moved, and another of them defines a spring expanding position to which the zigzag spring is to be expanded from the base position, whereby that one of two pawl elements may be moved toward the base position in relation to the reference fixed position by operation of the drive means until the same one pawl element is detected by the afore-said one of the selected paired adjoining proximity switches so as to bring the two pawl elements into engagement with both end portions of zigzag spring, respectively, and then, both two pawl elements may be moved by further operation of the drive means until the foregoing one of two pawl elements is detected by the afore-said another of the paired adjoining proximity switches so as to expand the zigzag spring, providing a positive chucking of the same spring.

Another features and advantages of the present invention will become apparent from reading of the descriptions hereinafter with reference to the drawings.

DETAILED DESCRIPTION OF PREFERRED EMBODIMENT OF THE INVENTION

Referring to FIGS. 1 through 6, there is illustrated one preferred mode of system and method for chucking a zigzag spring in accordance with the present invention.

Figure 1:
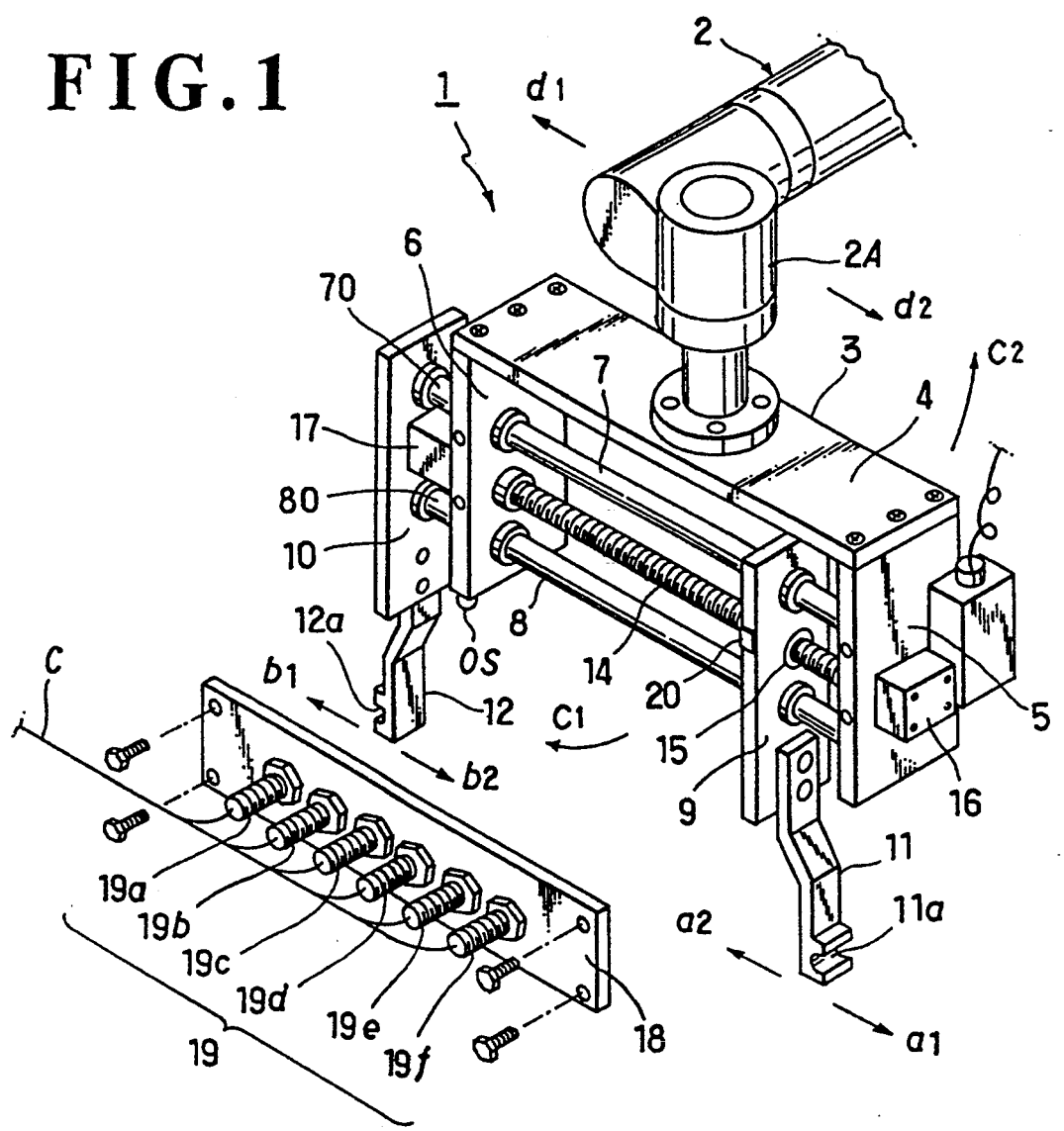
FIG. 1 is a partly exploded schematic perspective view of a zigzag spring chucking device in accordance with the present invention.
Figure 2:
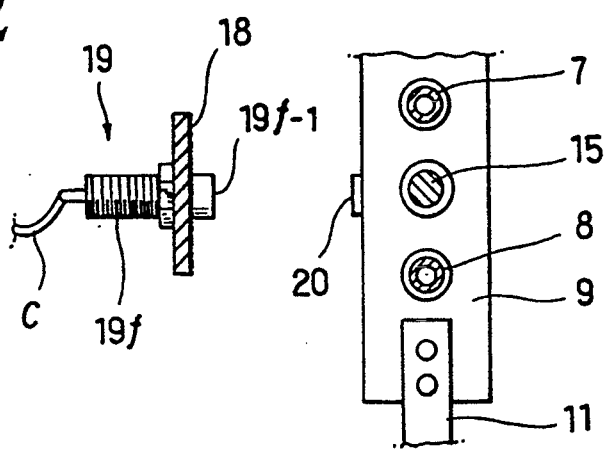
FIG. 2 is a partly sectional side view showing a principal part of the chucking device.

FIGS. 1 and 2 show a principal part of the device for chucking a zigzag spring as generally designated by (1). The spring chucking device (1) is connected firmly to an operation arm (2) of a spring mounting robot or a suitable industrial robot (not shown). The arm (2) is provided with a rotary actuation portion (2A) for not only causing revolution of the chucking device (1) about the central axis of that rotary actuation portion (2A), but also causing the chucking device (1) to be rotated vertically, as indicated by the arrows (c1)(c2), relative to the arm (2). The arm (2) is so controlled as to be displaced between a spring supplier (S) shown in FIG. 5 and a seat frame mounting section shown in FIG. 6, and further be moved laterally as indicated by the arrows (d1)(d2) in FIG. 1 in a finely adjustable way. Those motions are all required to set the chucking device (1) at one of plural spring suppliers (as at (S) in FIG. 5) for enabling a selective chucking of one of plural different zigzag springs with different lengths, as will be explained in detail later.

Designation (3) denotes a base framework of the chucking device (1) which comprises an upper plate frame member (4) and a pair of spaced-apart lateral plate frame members (5)(6). The two lateral plate frame members (5)(6) are each fixed to both ends of the upper plate frame (4), respectively, in a manner dependent therefrom, thereby forming the base framework (3) in a generally inverted U shape.

Disposed between the two lateral plate frame members (5)(6) are extended a pair of guide rods (7)(8) in parallel with each other. Both upper and lower guide rods (7)(8) penetrate through the left-side lateral plate frame member (6) and terminate in extensions (70)(80) outside thereof, respectively.

A first movable plate (9) is so supported by those two guide rods (7)(8) as to be slidable therealong, whereas a second movable plate (10) is likewise supported by the two guide rod extensions (70)(80).

As shown, a first pawl element (11) is fixed at its upper base part to the lower part of the first movable plate (9), and a second pawl element (12) is also fixed at its lower base part of the second movable plate (10), such that both first and second pawl elements (11)(12) are faced towards each other in a symmetrical manner.

The first pawl element (11) may be moved via the first movable plate (9) along the longitudinal direction of the guide rods (7)(8) by means of a screw drive mechanism comprising a outwardly threaded screw spindle (14), an internally threaded nut member (15) and a motor (16). The screw spindle (14) is rotatably supported by and extended between the two opposed lateral frame members (5)(6) such as to be interposed between the two guide rods (7)(8). As viewed from FIG. 1, one right-side end of the screw spindle (14) penetrates through the right-side lateral frame member (5) and is fixed to an output shaft (not show) of the motor (16) mounted on the outward surface of the same frame member (5). The nut member (15) is shown to be formed in the first movable plate (9) and meshed with the screw spindle (14). Accordingly, a normal or reverse drive of the motor (16) will cause the screw spindle (14) to be rotated in the corresponding direction to thereby move the first movable plate (9) and thus the first pawl element (11) in either of the directions (a1)-(a2).

On the other hand, the second pawl element (12) may be moved via the second movable plate (19) along the longitudinal direction of both guide rod extensions (70)(80) outside the left-side lateral frame member (6), by means of another drive mechanism which may comprise an air cylinder (17). The air cylinder (17) is interposed between that lateral frame member (6) and the second movable plate (10). Operating this air cylinder (17) will cause movement of the second movable plate (10) and thus the second pawl element (12) in either of the directions (b1)(b2). Designations (11a)(12a) denote an engagement portion of the first pawl element (11) for engagement with one end of a zigzag spring, and an engagement portion the second pawl element (12) for engagement with another end of the same spring, respectively. (see FIG. 6 for instance)

A plurality of proximity switches as generally designated by (19) are provided via a support plate (18) on a frontal side of the present chucking device (1), as shown in FIG. 1. In other words, the support plate (18) is fixed at both ends thereof to the two lateral frame members (5)(6), such that the proximity switches (19) are rowed equidistantly along the longitudinal direction of and in parallel with those guide rods and screw spindle (7, 8 and 14), facing their sensing heads towards the inside of the base framework of the device (1) (see FIG. 2). In the embodiment shown in FIG. 1, there are six proximity switches (19a)(19b)(19c)(19d)(19e)(19f) equipped equidistantly on the support plate (18). All the cords (C) of the proximity switches are electrically connected to a central processing unit (not shown) incorporated in a control circuitry of the robot.

As can be seen from FIGS. 1 and 2, provided on a frontal edge of the first movable plate (9) is an object element (20) to be sensed by one of the sensing heads respectively of those six proximity switches. It should be understood that each of the proximity switches has its own sensing head, like the one (19f-1) of the sixth proxmity switch (19f) as in FIG. 2. Hence, the object element (20) should be located at a point substantially equal to a level at which the proximity switches (19) lie, in order to insure that the element (20) is sensed by one of the switches (19). With that sensing arrangement, a present position of the first movable plate (9) or of the first pawl element (11) can be detected by the proximity switches (19), which will send a detection signal to a CPU stated above, and then the CPU will recognize it and output an instruction pulse, if any, to a relevant drive circuit so as to drive the motor (16) and/or the air cylinder (17) for an intended motion of both or either of the first and second pawl elements (11)(12). Although not shown, the motor (16) and air cylinder (17) are also electrically connected with such CPU, so that they may be driven under a predetermined control program to control the respective motions of the first and second pawl elements (11)(12), depending upon the sensing information from one of the proximity switches (19). In brief, the first pawl element (11) may be displaced from an arbitrary present position in one of the directions (a1)(a2) towards a chucking point corresponding to one of the proximity switches (19) selected by the CPU. The second pawl element (12), however, may only be moved within a predetermined stroke under the control of CPU.

Figure 5:
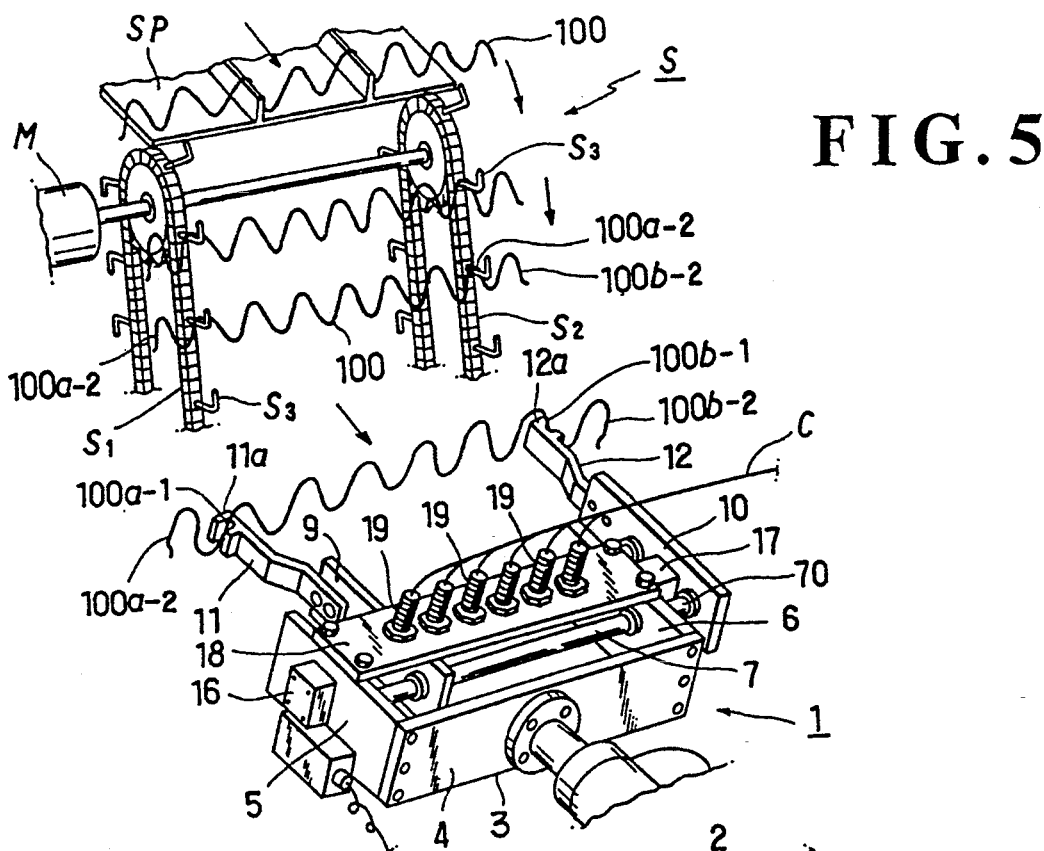
FIG. 5 is a partly broken perspective view showing the state where a zigzag spring supplied from a spring supplier is chucked by the chucking device.

Designation (OS) in FIG. 1 stands for an optical sensor for identifying a spring supplier (see (S) in FIG. 5). Though not clearly shown, there are plural different spring suppliers, like the one (S) in FIG. 5, provided in accordance with the present invention, each of which supplies different zigzag springs with different lengths. The above-constructed spring chucking device will be automatically set in a position with respect to each of those different spring suppliers with the aid of the optical sensor (OS) and provide a proper positioning of the first and second pawl elements (11)(12) according to a length of a selected one of different zigzag springs.

Now, a specific description will be made of the operation of spring chucking device (1), with a particular reference to FIGS. 3(A) through FIGS. 4(B) in conjunction with FIGS. 5 and 6.

Firstly, as shown in FIG. 5, a zigzag spring (100) is supplied from the spring supplier (S). The spring supplier (S) is a known endless-chain type spring supply apparatus comprising an upper spring supply plate (SP), a pair of spaced-apart endless chains (S1)(S2) and a motor (M). A set of plural springs are placed upstream of the supply plate (SP), and they are transferred down along the supply plate (SP), one by one, to be received by one set out of every paired L-shaped hangers (S3)(S3) each projecting from the respective pair of endless chains (S1)(S2). As the chains (S1)(S2) are rotated and stopped intermittently under a programmed control of the motor (M), one zigzag spring (100) is brought to a chucking position where it is chucked by the abovementioned chucking device (1).

As stated earlier, though not shown, there are provided a predetermined number of another spring suppliers constructed in a similar structure to the foregoing one (S), each of which supplies different zigzag springs of different lengths.

In accordance with the present invention, the chucking device (1) can be transferred by the arm (2) of robot to a desired one of those plural spring suppliers (of course including the illustrated spring supplier (S)), by identifying the same through the detection of optical sensor (OS) which emits a light to that particular spring supplier and senses a reflected light to thereby detect the length of zigzag springs to be supplied therefrom. In that way, a shortest zigzag spring, a second shorter zigzag spring, a longer spring or so forth may be selected for the subsequent chucking action of the device (1). The selective chucking action is effected through the plural proximity switches (19a, 19b, ...) and pair of first and second pawl elements (11)(12) under a programmed control of the associated motor (16) and air cylinder (17). In this respect, the number of proximity switches generally designated by (19) may be determined, depending on how many sorts of zigzag springs with different lengths should be chucked for mounting to a seat frame or plural different seat frames. In the illustrated embodiment, the proximity switch (19) comprises first to sixth individual proximity switches (19a, 19b, 19c, 19d, 19e and 19f), which means that the present chucking device (1) is capable of selectively chucking one of total six different zigzag springs. Thus, for instance, a computerized control circuitry of robot or a CFU (not shown) should be so programmed that, after identifying the spring supplier or the zigzag spring to be chucked, the second pawl element (12) is firstly positioned as a reference fixed point with respect to one end portion of the selected zigzag spring, and then the first pawl element (11) is moved by operation of the motor (16) in one of the directions (a1)(a2), in relation to that reference fixed point, towards a selected point corresponding to selected one of the proximity switches (19), thereby placing the pawl element (11) in a state for chucking another end portion of the spring, after which, the first pawl element (11) is moved outwardly towards a point corresponding to another adjoining proximity switch, while simultaneously, the second pawl element (12) is moved in a direction opposite to that of the first one (11), so as to expand slightly the spring, making the chucking of both first and second pawl elements (11)(12).

Figure 3:
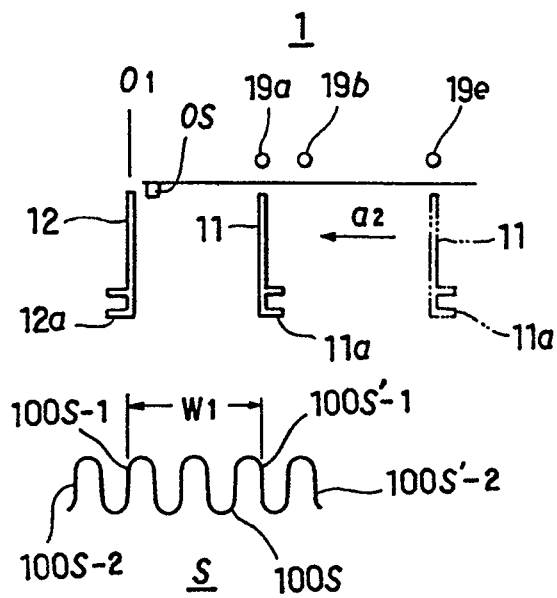
FIG. 3(A) is a schematic diagram showing a positional relation of two pawl elements in respect to a zigzag spring of a smallest length.
FIG. 3(B) is a schematic diagram showing the zigzag spring to be chucked in an expanded state by the two pawl elements.
Figure 4:
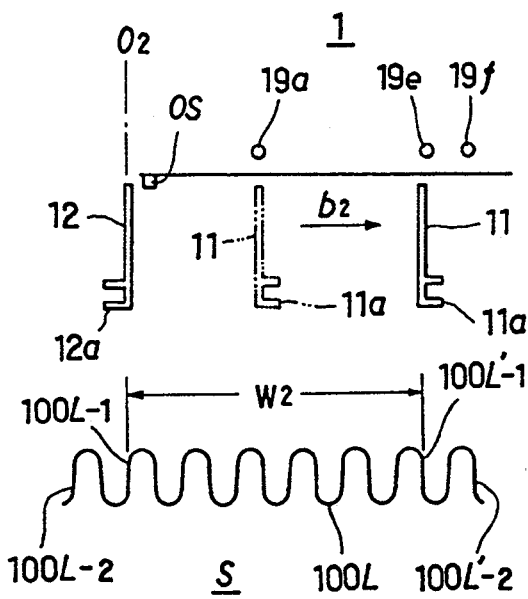
FIG. 4(A) is a schematic diagram showing a positional relation of two pawl elements in respect to a zigzag spring of a greatest length.
FIG. 4(B) is a schematic diagram showing the zigzag spring to be chucked in an expanded state by the two pawl element.
Figure 3:
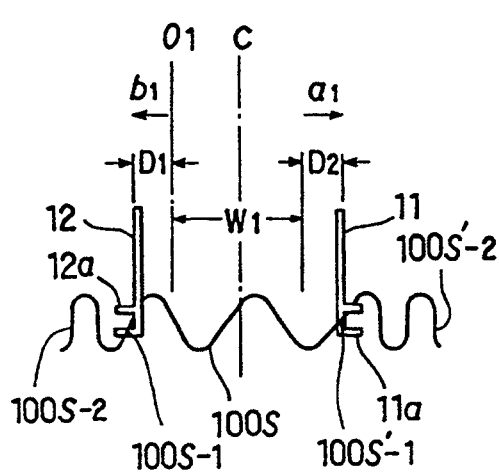
Figure 4:
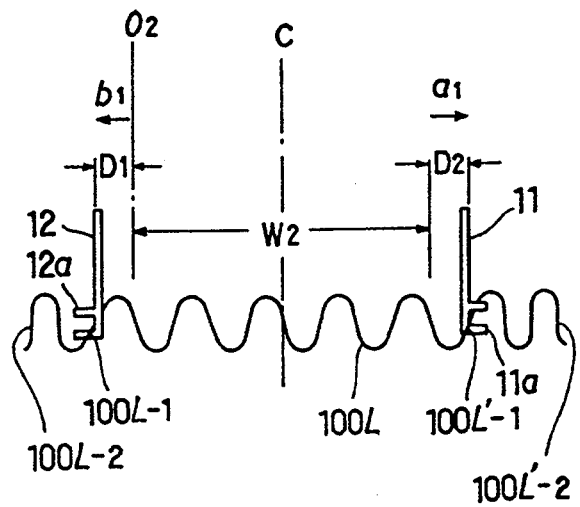

More specifically, reference is made to FIGS. 3(A) to 4(B). FIGS. 3(A) and 3(B) show the case where a zigzag spring of a smallest length (100S) is to be chucked by the present chucking device (1). By contrast, FIGS. 4(A) and 4(B) show a zigzag spring of a greatest length (100L) to be chucked by the same device (1). This is, however, one exemplary case to facilitate the understanding about the spring chucking operations and method of the present invention, and therefore may be applied to any of other zigzag springs of second smaller or medium lengths used for the chucking device (1).

It is noted here that designations (S1)(S2) stand for a zigzag spring supplier for supplying the shortest spring (100S) and a zigzag spring supplier for supplying the longest spring (100L), respectively, and that they are basically identical to the aforementioned spring supplier (S) shown in FIG. 5 in terms of structure and endless-chain conveyor mechanism. Thus, the supplier (S) in FIG. 5 generally represents the zigzag spring suppliers used in the present invention.

Referring now to FIG. 3(A), the chucking device (1) is shown to be positioned at a point facing towards the zigzag spring supplier (S1), and a zigzag spring of the smallest length (100S) is also shown to be supplied from that supplier (S1). The chucking device (1) recognizes the spring (100S) to be of the smallest length through the detection of optical sensor (OS). Then, the body of device (1) is displaced laterally in either direction (d1) or direction (d2) as indicated in FIG. 1 by the robot arm (2) under a programmed control, so as to set the second pawl element (12) at a given reference fixed position (O1). Thereafter, the motor (16) is driven to cause the first pawl element (11) to move in the direction (a1) from a present position (e.g. at a point corresponding to the sixth switch (19e)) towards a base position corresponding to the first proximity switch (19a). At this point, the two pawl elements (11)(12) are located away from each other a distance substantially equal to a width (W1) in the spring (100S). As shown, the width (W1) is defined, covering several hill and valley portions of the spring (100S) from one vertical rectilinear section (100S-1) to another opposite one (100S'-1) thereof. Those two vertical rectilinear sections (100S-1)(100S'-1) form engagement areas of the spring (100S) to be engaged by the engagement portions (11a) (12a) of first and second pawl elements (11)(12), respectively. Preferably, each of such engagement areas (100S-1)(100S'-1) should be defined adjacent to the respective securing ends (100S-2)(100S'-2) with one valley portion in therebetween, the securing ends (100S-2)(100S'-2) being to be secured to hangers of seat frame as will be explained later. When both first and second pawl element engagement portions (11a)(12a) are brought to engagement with the foregoing spring engagement areas (100S-1)(100S'-1) by the controlled motion of the robot arm (2), the motor (16) and air cylinder (17) are driven simultaneously to cause the first and second pawl elements (11)(12) to move a same distance (D1)(D2) away from each other in the opposite directions (a1) (b1), as shown in FIG. 3(B), for the purpose of expanding the zigzag spring (100S). In this regard, the distance (D1, D2) is preset as the distance between the first and second proximity switches (19a)(19b), and therefore, the control unit or CPU of robot instructs to allow movement of both pawl elements (11) (12) until the second proximity switch (19b) detects the first pawl element (11), while simultaneously counting the distance and storing the counted data in memory as a distance between a base position and spring expanding position. Upon the second proximity switch (19b) detecting the first pawl element (11), the CPU will immediately give an instruction to stop both operations of the motor (16) and air cylinder (17), whereupon the first and second pawl elements (11)(12) are stopped at a point advanced the distance (D1, D2). Accordingly, the spring (100S) is resiliently expanded by both first and second pawl elements (11)(12) in the longitudinal direction thereof, which produces a proper tension force in the spring (100S) per se to make the chucking operation, thereby preventing the spring (100S) against any accidental disengagement from both engagement portions (11a)(12a) of first and second pawl elements.

Figure 6:
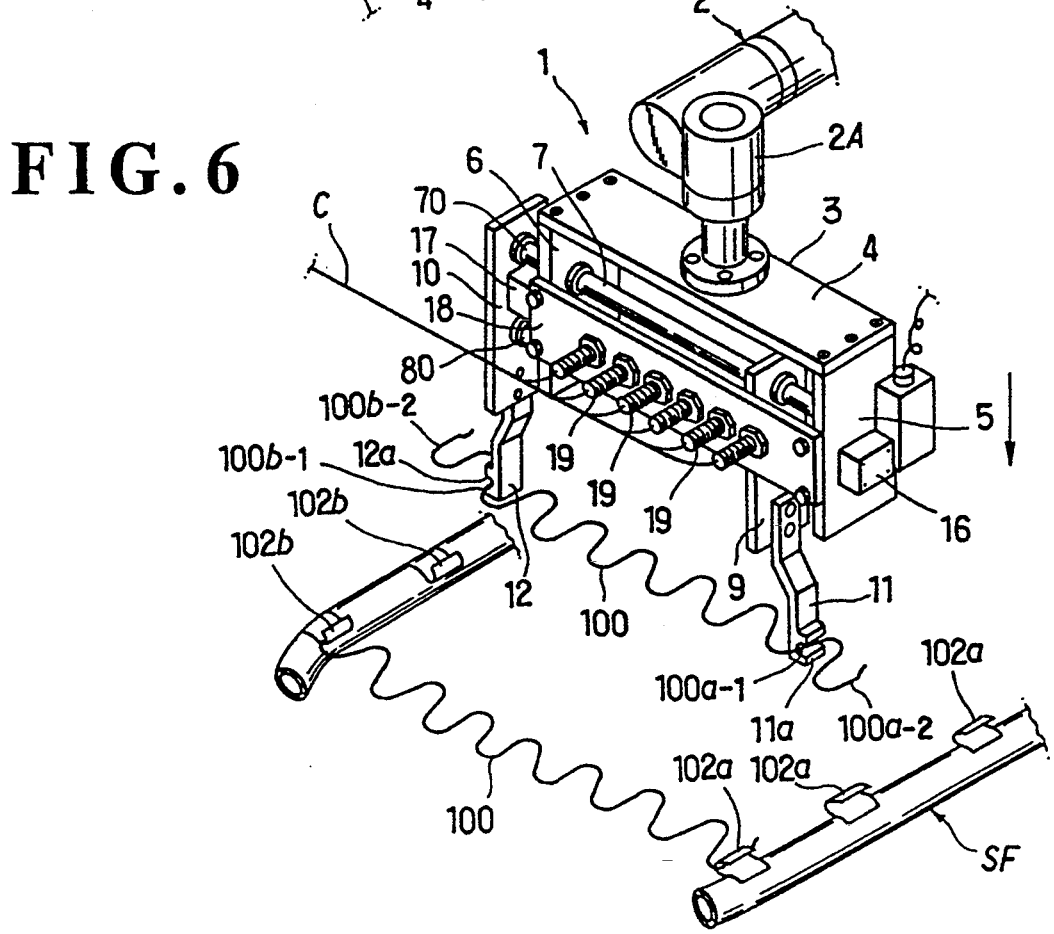
FIG. 6 is a partly broken perspective view showing the state where the zigzag spring chucked by the chucking device is being mounted onto a seat frame.

Then, the zigzag spring (100S) thus chucked by the present device (1) is transferred by the controlled motion of robot arm (2) towards a seat frame (SF) as shown in FIG. 6. Both spring and device (100S)(1) are moved in the downward arrow direction to a position aligned with a line along which two spring hangers (e.g. (102a)(102b)) faces towards each other on the respective lateral frame sections of seat frame (SF), with both zigzag spring securing ends (100S-2)(100S'-2) being positioned at and outside the respective spring hangers. Thereafter, the CPU instructs the motor and air cylinder (16)(17) to drive reversely so as to return both first and second pawl elements (11)(12) to the base position defined by the first proximity switch (19a) and the reference position (O1), respectively, according to the foregoing counted data, so that the pawl elements are stopped there when the same switch (19a) detects the return of the first pawl element (11). As a result of this, both securing ends (100S-2)(100S'-2) of the spring (100S) are released from the expanded state and resiliently engaged over the respective two hangers (e.g. (102a)(102b)) of seat frame (SF), completing thus the mounting of spring (100S) onto the seat frame (SF).

It should be noted that FIG. 6 generally represents the state where a zigzag spring is mounted by the present chucking device (1) onto the seat frame (SF) and for that reason, the shown spring is designated by (100) as a general zigzag spring, referring indirectly to either the above-described shortest zigzag spring (100S) or the longest zigzag spring (100L) to be described hereinafter.

On the other hand, referring to FIGS. 4(A) and 4(B), there is shown a zigzag spring of a greatest length (100L) and the present chucking device (1) positioned at a point facing towards a spring supplier (S2) which supplies that particular spring (100L).

In this case, the chucking device (1) is displaced laterally in one of the directions (d1)(d2) by the robot arm (2) through the detection of optical sensor (OS), so as to set the second pawl element (12) at a different reference fixed position (O2) than that for the shortest zigzag spring (100S) stated above, because of the difference in length between the two springs (100L) and (100S). It is noted here that the reference fixed position (O2) of second pawl element (12) is set at a point on a line extending along the vertical rectilinear section (100L-1) of the spring (100L), as similar to that (O1) of same which extends along the rectilinear section (100S-1) of the shortest spring (100S). Then, the motor (16) is driven to cause the first pawl element (11) from a present position (i.e. at a point corresponding to the first proximity switch (19a) for example) towards a new base position corresponding to the fifth proximity switch (19e). Hence, the two pawl elements (11)(12) are located away from each other a distance substantially equal to a width (W2) defined between the two opposed rectilinear sections (100L-1)(100L'-1) which form engagement areas of the spring (100L) to be engaged by the engagement portions (11a)(12a) of first and second pawl elements (11)(12). Designations (100L-2)(100L'-2) denote the securing ends of the spring (100L), respectively, which are to be engaged over hangers of seat frame (SF) as will be explained later.

Next, with the first and second pawl element engagement portions (11a)(12a) being brought to engagement with the foregoing spring engagement areas (100L-1) (100L'-1), both motor and air cylinder (16)(17) are driven simultaneously to cause the first and second pawl elements (11)(12) to move the same distance (D1) (D2) away from each other in the opposite directions (a1)(b1), in the same way as they are done in the above-described embodiment in FIG. 3(B), to thereby expand the present longest spring (100L) for the firm chucking purpose. Thus, as similar to the processes of that FIG. 3(B) embodiment, when the sixth proximity switch (19f) detects the first pawl element (11), both motor and air cylinder (16)(17) are stopped, thus causing stop of the first and second pawl elements (11)(12) at a point advanced the distance (D1, D2).

The zigzag spring (100L) thus chucked by the device (1) is transferred to the seat frame (SF) shown in FIG. 6. In this stage also, as similar to the processes of the FIG. 3(B) embodiment, after the device (1) is lowered to a spring securing position relative to the seat frame (SF), both securing ends (100L-2)(100L'-2) of the spring (100L) are released from the expanded state and engaged resiliently over the respective hangers of seat frame (SF) as both first and second pawl elements (11)(12) are returned to the base position defined by the fifth proximity switch (19e) and the reference position (O2), respectively, under the same control of CFU. The spring (100L) are thus mounted securely on the seat frame (SF).

From the descriptions above, it is to be appreciated that, in accordance with the present embodiment, the first pawl element (11) may be displaced to one of the five base positions, each being defined by the first to fifth proximity switches (19a to 19e), in relation to the reference fixed position of the second pawl element (12), and thereafter, both first and second pawl elements (11)(12) may be moved away from each other the common distance (D1, D2) corresponding to one of five spring expanding positions, each being defined by the second to sixth proximity switches (19b to 19f) which each outwardly adjoins one of the first to fifth proximity switches (19a to 19e) from the side of such reference fixed position.

Otherwise stated, with regard to "n" numbers of different zigzag springs, each of which is increased in length in the "n" orders, let the corresponding numbers of proximity switches be also "n", wherein the "n" refers to a natural number. Then, it follows in general that the base position stated above may be set by an "n" order of proximity switch with respect to an "n" order of zigzag spring, and the spring expanding position stated above may be set by a "(n+1)" order of proximity switch with respect to such "n" order of proximity switch.

Accordingly, a shortest zigzag spring (like the one (100S)) may be chucked by a set of the first and second proximity switches (19a)(19b), a second shorter zigzag spring be chucked by a set of the second and third proximity switches (19b)(19c), a medium length of zigzag spring be chucked by a set of the third and fourth proximity switches (19c)(19d), a second longer zigzag spring be chucked by a set of the fourth and fifth proximity switches (19d)(19e), and a longest zigzag spring (like the one (100L)) by chucked by a set of the fifth and sixth proximity switches (19e) (19f), in this order.

Moreover, the present chucking device (1) offers a reference fixed position by the second pawl element (12) according to the five different lengths of zigzag springs, for instance in this particular embodiment. Relative to that reference fixed position, the first pawl element (11) may be moved to one of the above-discussed base positions, to thereby set both two pawl elements (11)(12) in a position to chuck a selected one of the five zigzag springs, and thereafter, those two elements (11)(12) are moved away from each other, the same distances (which are defined by one selected set of equidistant two proximity switches as readily understandable from the above descriptions) in a symmetrical direction relative to the central line (C), as can be seen from both FIGS. 3(B) and 3(C).

With such simple yet high efficient arrangement, any of five or plural different zigzag springs can be expanded uniformly in the longitudinal direction, insuring to make more precise and positive the spring chucking operation of the device (1).

In accordance with the present invention, therefore, both first and second pawl elements (11)(12) can be positioned properly to selectively chuck one of plural different zigzag springs with different lengths, whereby those plural different zigzag springs may be mounted on a seat frame or the corresponding different plural seat frames, only through one single chucking device (1).

While describing the present invention thus far, it should be understood that the invention is not limited to the illustrated embodiment, but any other modifications, replacements and additions may be applied thereto structurally without departing from the scopes and spirits of the appended claims.

What is claimed is:

1. A device for chucking a zigzag spring, for use in a system for automatically mounting a zigzag spring onto a frame, said device comprising:

a first pawl element adapted to be engageable with one end portion of said zigzag spring, said first pawl element being normally stopped at a reference fixed position corresponding to said one end portion of said zigzag spring;

a second pawl element adapted to be engageable with another end portion of said zigzag spring, said second pawl element being movable toward and away from said reference fixed position to a selected one of plural positions which corresponds to said another end portion of said zigzag spring;

a plurality of detecting means, each defining one of said plural positions, adjacent said second pawl element;

a first drive means for causing movement of said first pawl element from said reference fixed position; and a second drive means which is operable in conjunction with said plurality of detecting means to cause movement of said second pawl element toward said selected one of plural positions;

wherein when said second drive means is operated in conjunction with said detecting means, said second pawl element is moved to said selected one of said plural positions, so that both said first and second pawl elements are positioned for engagement with respective said one and another ends of said zigzag spring in accordance with a particular length of said zigzag spring, whereafter said pawl elements are moved to engage respective end portions of said zigzag spring, and when said first and second drive means are subsequently operated, said first and second pawl elements are moved away from each other so as to expand said zigzag spring lengthwise more than said particular length, thereby chucking said zigzag spring in a length which allows the same to be properly mounted onto said frame.

2. The device as defined in claim 1, wherein said detecting means comprises a plurality of proximity switches, and said plural positions are respectively defined by said plurality of proximity switches, whereby said second pawl element may be moved to and stopped at said selected one of plural positions by operation of said second drive means through detection of said second pawl element by a corresponding one of said plurality of proximity switches.

3. The device as defined in claim 1, wherein said first drive means comprises an air cylinder, and said second drive means comprises a powered screw drive mechanism including a motor, a screw spindle connected to said motor, and a nut member threadedly engaged with said screw spindle, wherein said nut member is connected to said second pawl element.

4. The device as defined in claim 3, further including a base frame in which said screw spindle extends horizontally, said second pawl element being movable along said screw spindle toward and away from said reference fixed position at which said first pawl element is normally located, through operation of said powered screw drive mechanism, said plurality of detecting means being disposed generally in parallel with said screw spindle.

5. The device as defined in claim 1, wherein a pair of said detecting means is selected from said plurality of detecting means according to the length of said zigzag spring, wherein one of said pair of detecting means defines a base position corresponding to said selected one of plural positions, and the other of said pair of detecting means defines a spring expanding position located away from said base position, so that said second pawl element may be moved from the position at which it is engaged with said another end portion of the zigzag spring, while at the same time, said first pawl element is also moved from said reference fixed position, in a direction opposite to such movement of said second pawl element, whereby said zigzag spring may be expanded and chucked in a length which allows the same to be properly mounted onto said frame.

6. The device as defined in claim 5, wherein said pair of detecting means defines a spacing therebetween, and, after said pawl elements are engaged with respective end portions of said zigzag spring, said first and second pawl elements are each movable away from each other by a distance equal to said spacing in order to expand and chuck the spring to said length allowing the same to be precisely mounted onto said frame.

* * * * *